US012566612B2

(12) United States Patent
Kamaraj et al.

(10) Patent No.: US 12,566,612 B2
(45) Date of Patent: Mar. 3, 2026

(54) SCHEDULING OF DUPLICATE THREADS

(71) Applicant: Imagination Technologies Limited, Kings Langley (GB)

(72) Inventors: Revanth Kamaraj, Hertfordshire (GB); Vamshi Kadiyala, Hertfordshire (GB); Jack Andrew, Hertfordshire (GB); Ozgur Ozkurt, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 43 days.

(21) Appl. No.: 18/391,470

(22) Filed: Dec. 20, 2023

(65) Prior Publication Data

US 2024/0231832 A1     Jul. 11, 2024

(30) Foreign Application Priority Data

Dec. 21, 2022   (GB) ..................................... 2219357
Dec. 21, 2022   (GB) ..................................... 2219359

(51) Int. Cl.
*G06F 9/38*      (2018.01)
*G06F 9/30*      (2018.01)
*G06F 9/48*      (2006.01)

(52) U.S. Cl.
CPC .......... *G06F 9/3836* (2013.01); *G06F 9/3009* (2013.01); *G06F 9/4812* (2013.01); *G06F 9/4881* (2013.01)

(58) Field of Classification Search
CPC .... G06F 9/3836; G06F 9/3009; G06F 9/4812; G06F 9/4881; G06F 11/1494;
(Continued)

(56) References Cited

U.S. PATENT DOCUMENTS

| | | | | |
|---|---|---|---|---|
| 6,205,414 B1 * | 3/2001 | Forsman | ............... | G06F 9/4843 |
| | | | | 703/26 |
| 6,615,366 B1 * | 9/2003 | Grochowski | ......... | G06F 9/3851 |
| | | | | 712/E9.035 |
| 7,865,770 B2 * | 1/2011 | Quach | ................... | G06F 9/3858 |
| | | | | 714/45 |

(Continued)

FOREIGN PATENT DOCUMENTS

GB          2555628  A      5/2018

OTHER PUBLICATIONS

Hukerikar et al: "An evaluation of lazy fault detection based on Adaptive Redundant Multithreading", 2014 IEEE High Performance Extreme Computing Conference (HPEC), IEEE, Sep. 9, 2014 (Sep. 9, 2014), pp. 1-6.
(Continued)

*Primary Examiner* — Farley Abad
(74) *Attorney, Agent, or Firm* — Potomac Law Group, PLLC; Vincent M DeLuca

(57)                ABSTRACT

A safety thread scheduler configured to schedule a check thread for a critical thread being run on one of a plurality of execution units, the check thread being a duplicate of the critical thread, wherein the safety thread scheduler is configured to schedule the check thread to begin being run on a second one of the plurality of execution units before the end of a safety time-window for scheduling the check thread. The safety thread scheduler is further configured to allow the check thread, when the check thread is running on the second one of the plurality of execution units, to be interrupted by a further thread and to re-schedule the check thread to be resumed by expiry of a re-scheduling time limit.

19 Claims, 6 Drawing Sheets

(58) Field of Classification Search
CPC ...... G06F 9/505; G06F 9/5083; G06F 9/5005;
G06F 11/1608; G06F 11/1629; G06F
11/1641; G06F 2209/5018; G06F 11/1497
See application file for complete search history.

(56) References Cited

U.S. PATENT DOCUMENTS

| | | | |
|---|---|---|---|
| 2005/0015766 A1* | 1/2005 | Nash | G06F 9/4881 |
| | | | 718/102 |
| 2005/0050304 A1* | 3/2005 | Mukherjee | G06F 11/1494 |
| | | | 712/218 |
| 2005/0050307 A1 | 3/2005 | Reinhardt et al. | |
| 2013/0019083 A1* | 1/2013 | Cain, III | G06F 9/30087 |
| | | | 712/203 |
| 2014/0007114 A1* | 1/2014 | Wang | G06F 3/0653 |
| | | | 718/102 |
| 2018/0293169 A1* | 10/2018 | Beard | G06F 12/1054 |
| 2021/0004235 A1 | 1/2021 | Hari et al. | |

OTHER PUBLICATIONS

Oz et al: "A user-assisted thread-level vulnerability assessment tool", Concurrency and Computation: Practice and Experience, Wiley, London, GB, vol. 31, No. 13, Nov. 20, 2018 (Nov. 20, 2018), page n/a.

Prasanth Vet al: "Exploiting Application Tolerance for Functional Safety", 2021 IEEE International Test Conference (ITC), IEEE, Oct. 10, 2021 (Oct. 10, 2021), pp. 399-408.

Doran et al., "Dynamic Lockstep Processors for Applications with Functional Safety Relevance," 2021 26th IEEE International Conference on Emerging Technologies and Factory Automation (ETFA ), Vasteras, Sweden, 2021, pp. 1-4, doi: 10.1109/ETFA45728.2021. 9613543.

Meyer et al., "Reducing the Cost of Redundant Execution in Safety-Critical Systems using Relaxed Dedication," IEEE Xplore Conference: Design, Automation & Test in Europe Conference & Exhibition Apr. 2011, DOI: 10.1109/DATE.2011.5763200.

Pena-Fernandez et al., "Dual-Core Lockstep Enhanced with Redundant MultiThread Support and Control-Flow Error Detection," Microelectronics Reliability, vol. 100-101, 113447, 2019, https:// doi.org/10.1016/j.microrel.2019.113447.

Subramanyan et al., "Multiplexed Redundant Execution: A Technique for Efficient Fault Tolerance in Chip Multiprocessors," 2010 Design, Automation & Test in Europe Conference & Exhibition (Date 2010), Dresden, Germany, 2010, pp. 1572-1577, doi: 10.1109/ DATE.2010.5457061.

* cited by examiner

SCHEDULING OF DUPLICATE THREADS

CROSS-REFERENCE TO RELATED APPLICATIONS AND CLAIM OF PRIORITY

This application claims foreign priority under 35 U.S.C. 119 from United Kingdom patent application Nos. GB2219357.7 and GB2219359.3 both filed on 21 Dec. 2022, which are incorporated by reference herein in their entirety.

BACKGROUND

Many modern processing systems have two or more parallel execution units, e.g. separate CPU cores on the same chip, enabling the running of respective sequences of instructions in parallel on the different execution units. Each sequence of instructions may comprise one or more threads. Typically such an arrangement is used to run a different sequence of instructions on each of the execution units, in parallel with one another, in order to increase the number of unique processing operations that can be performed per unit time.

However, it is also possible to use a second one of the execution units (e.g. cores) to run a duplicate instance of a "critical" thread running on a first of the execution units. This may be done as a "safety check", to check that the system has executed the critical thread without error. I.e. in a processing system having at least two parallel execution units, then as well as parallel execution of different threads, one execution unit can also be used to run a redundant instance of a thread run on another execution unit in order to check that the system is working as expected (N.B. parallel execution refers here not to interleaving threads through the same execution unit in a time-shared manner, but rather execution on independent hardware). If the two instances of the thread produce the same result, then this evidences that the processor is working, but if not then this shows there has been a hardware or software fault (an actual fault in the operation of the processing system rather than just a bug due to an error by the developer). For instance a hardware fault may have developed in the hardware of the processing system, or there may have been a random bit flip in the data or code when held in memory or registers (e.g. a cosmic bit flip caused by cosmic radiation).

An example application for such checks is found in a processing system onboard an autonomous or semi-autonomous vehicle (e.g. car, plane or train), where the thread to be checked may be configured to perform a critical operation for controlling the motion of the vehicle, or outputting critical information (e.g. speed or engine temperature) through a user interface of the vehicle (e.g. through a head-up-display, HUD, of the vehicle). Another example application could occur in medical robotics, where the critical thread may be configured to perform an operation for controlling the robot to perform an action (e.g. surgical action) on a human being or other living being. In such applications a cosmic bit flip or hardware fault, for example, could have catastrophic effects.

Some standards may actually require the running of a duplicate process on parallel hardware for certain processes. For example ASIL-D (Automotive Safety Integrity Level D) is a specification under international standard ISO 26262 which defines certain safety measures that must be taken in relation to automotive systems for controlling of road vehicles.

More generally, "critical" for the present purposes means critical to the desired application for which the thread in question is being run. Particularly, "critical" may refer herein to any thread for which it is desired to run a duplicate instance—the check thread—and check at least one result of at least one operation performed by the critical thread against a corresponding result of the same operation performed by the check thread. Similarly, the terms "safety" or "safety check" in this context just refer to taking a precaution against an error in the execution of a critical thread, by means of the duplicate execution and comparison of the results. The terms "critical" and "safety" as used herein do not necessarily imply that the safety of a human or other living being is at risk, though those are certainly examples of safety critical applications.

The processing system may run both critical threads and non-critical threads at various times. A non-critical thread is a thread for which a redundant instance does not need to be run. The critical threads are scheduled in amongst the non-critical threads at various times across the multiple execution units (e.g. cores) of the system.

Conventionally in order to perform the check on a critical thread, then the two threads—the critical thread and its check thread—are executed in "lockstep". This means they are executed at exactly the same time. Executing both threads in lockstep helps capture errors that occur at the same time, at the same point in the code. In practice the two threads may be offset from one another by a small predetermined number of clock cycles to avoid an error from hitting both cores at the same time and state (execution at exactly the same time is fine if one accepts the assumption that the error occurs only in one execution unit, but if the same error occurred in both then error would be masked, which is why in practice one of the threads is typically delayed a little bit with respect to the other).

The lockstepped execution may be setup by the operating system (OS) running on the processing system, or may be implemented by means of dedicated hardware that locksteps the cores.

SUMMARY

However, an issue with lockstepping the execution of two threads is that to set up lockstepped execution introduces latency. The two instances of the critical thread can only be scheduled to begin executing at the same time (or within a few cycles of one another) if two idle execution units are both available at the same time. However, if most or all of the execution units of the processing system are busy executing non-critical threads, then it is unlikely that two of the execution units will simply happen to become idle at the same time. If that is the case, then conventionally the OS or lockstep hardware will have to force two execution units to become idle at the same time. Since the execution of different non-critical threads on different execution units is unlikely to be aligned in time, this means deliberately holding back scheduling on one execution unit—i.e. deliberately holding one execution unit in an idle state after the end of its last non-critical thread while waiting for another execution unit to become idle—so as to artificially create a window in which two execution units are idle and the two instances of the critical thread can begin at the same time. Therefore this will result in additional idle time being introduced, thereby impacting the overall processing throughput of the processing system.

It would be desirable to provide a system that would enable the scheduling of critical threads and their corresponding check threads without introducing the idle time penalty of strict lock-stepping, but while ensuring that the check thread is still executed within a certain safety time-window of the critical thread.

According to a first aspect disclosed herein there is provided a processing system comprising a plurality of parallel execution units each operable to execute a respective series of threads, wherein at least some of the threads executed by at least some of the execution units are non-critical threads not being designated as critical. The processing system also comprises request buffering storage operable to receive a request indicating that one of the threads in the respective series executed by a first one of the execution units is designated as a critical thread; and safety thread scheduling circuitry arranged to read the request from the request buffering storage, and in response to schedule a check thread, being a duplicate of the critical thread, to be executed on a second one of the plurality of execution units other than the first execution unit. The processing system further comprises result buffering storage arranged to buffer one of: a first result being a result of the execution of the critical thread on the first execution unit, and a second result being a result of the execution of the check thread on the second execution unit; and comparison circuitry arranged to compare said one of the first and second results from the result buffering storage with the other of the first and second results, and to raise error signal if the first and second results do not match according to said comparison. The request includes an indication of a safety time-window. The safety thread scheduling circuitry is configured to detect when at least one of the execution units is idle, and if none of the execution units is detected to be idle by the expiry of the safety time-window, to interrupt one of the non-critical threads executing on a non-idle one of the execution units and select the non-idle execution unit as the second execution unit to execute the check thread in place of the interrupted thread.

The disclosed system thereby allows the primary instance of the critical thread to begin executing before its duplicate instance, the check thread. The disclosed system thereby removes the need to artificially hold one execution unit in the idle state to wait for another to become idle at the same time. This is made possible because, instead of requiring lockstep, the safety window provides a guard against the eventuality that another execution unit does not become idle within a sufficient amount of time to check the result of the critical thread. In other words the ability to interrupt a non-critical thread ensures that the check thread will always be scheduled within a sufficient amount of time. The value of the safety time-window may depend on the particular application in question, and may be programmable.

If (as will usually be the case) a second execution unit is not available immediately upon the start of the execution of the primary instance of the critical thread, then depending on implementation, the check thread (the secondary or duplicate instance of the critical thread) may interrupt one of the non-critical threads any time up to the end of the time window, after which it must interrupt a non-critical thread if no execution unit has naturally become available by that time. Preferably the safety thread scheduling circuitry will schedule the check thread as soon as an idle execution unit becomes available, or at the expiry of the safety window, whichever is sooner.

In embodiments the safety thread scheduling circuitry may be configured so as: i) if one of the execution units is detected to be idle upon the reading of the request from the request buffer storage to thereupon select an idle one of the execution units as the second execution unit to begin the execution of the check thread; but ii) if none of the execution units is detected to be idle upon the reading of the request, to wait and detect whether one becomes newly idle before the expiry of the safety time-window if so and thereupon select the newly idle execution unit as the second execution unit to begin the execution of the check thread; and iii) if none becomes idle by the expiry of the safety time-window, to perform said interruption of one of the non-critical threads executing on a non-idle one of the execution units and select the non-idle execution unit as the second execution unit to begin the execution of the check thread in place of the interrupted non-idle thread.

If a check thread begins being executed before the expiry of the safety window, it may be described herein as being "eager" or executed "eagerly". Some embodiments disclosed herein may allow for additional flexibility as to how eager check threads are handled.

In embodiments, the safety thread scheduling circuitry may be configured so as to allow the check thread to be interrupted if executed eagerly, being executed eagerly if the execution of the check thread begins being executed before the expiry of the safety time-window. The interruption of the check thread may comprise scheduling one or more further critical or non-critical threads to be executed on the second execution unit in place of the check thread.

In embodiments, the safety thread scheduling circuitry may be configured so as, if the one or more further threads have not completed by expiry of a re-scheduling time limit, to interrupt one of the one or more further threads by resuming the execution of the check thread on the second execution, but otherwise to resume execution of the check thread following the completion of the one or more further threads. The re-scheduling time limit may be either: a) the expiry of safety time-window, b) the expiry of the safety time-window plus any time already spent executing the check thread, or c) a time in between a) and b).

In embodiments, the safety thread scheduling circuitry may be configured so as, when the eagerly executed check thread is interrupted by the further thread, to migrate the eagerly executed check thread to another of the execution units other than the first and second execution units.

The concept of eager execution can also be used independently, regardless of how the check thread was originally scheduled. For example, regardless of whether the check thread began executing in lockstep with its corresponding critical thread or was delayed until an execution unit became idle, the idea of eager execution can be applied to subsequently allow the check thread to be interrupted after it has started, as long as that interruption is before the expiry of the re-scheduling time limit. E.g. in embodiments, the system might wait for two execution units to become available at once as in the prior art. Or the check thread could even interrupt another, non-critical thread immediately (or only a few cycles after) the start of the corresponding critical thread, such that they begin executing in lockstep. Even in such scenarios, this does not preclude that the check thread could subsequently be interrupted by a further thread if there is still sufficient time available (according to the limits defined by the application) to reschedule the check thread and obtain its results. Having the ability to interrupt such an "eagerly" executed check thread (i.e. check thread that begins executing earlier than necessary), regardless of whether the check thread originally interrupted another thread or not, will advantageously allow for more opportunities for scheduling threads and therefore more flexibility in the scheduling of threads in a processing system comprising multiple execution units (e.g. multiple cores), e.g. allowing more opportunities for hiding latency.

Hence according to a second aspect disclosed herein, which may be used independently of or in conjunction with the first aspect, there is provided a safety thread scheduler configured to schedule a check thread for a critical thread being run on one of a plurality of execution units, the check thread being a duplicate of the critical thread. The safety thread scheduler may be configured to schedule the check thread to begin being run on a second one of the plurality of execution units before the end of a safety time-window for scheduling the check thread. Further, the safety thread scheduler may be configured to allow the check thread, when the check thread is running on the second one of the plurality of execution units, to be interrupted by a further thread and to re-schedule the check thread to be resumed by expiry of a re-scheduling time limit.

In embodiments the interrupted check thread could be rescheduled again on the same, second execution unit (e.g. if the further thread finishes before the end of the re-scheduling time limit, or if the further thread is interrupted to resume the check thread). Alternatively the check thread could be re-scheduled by migrating it to a third execution unit, other than the first and second execution units.

The safety thread scheduler or processing system may be embodied in hardware on an integrated circuit. There may be provided a method of manufacturing, at an integrated circuit manufacturing system, a processing system in accordance with any embodiment disclosed herein. There may be provided an integrated circuit definition dataset that, when processed in an integrated circuit manufacturing system, configures the system to manufacture the processing system. There may be provided a non-transitory computer readable storage medium having stored thereon a computer readable description of a processing system that, when processed in an integrated circuit manufacturing system, causes the integrated circuit manufacturing system to manufacture an integrated circuit embodying a processing system in accordance with any embodiment disclosed herein.

There may be provided an integrated circuit manufacturing system comprising: a non-transitory computer readable storage medium having stored thereon a computer readable description of the processing system; a layout processing system configured to process the computer readable description so as to generate a circuit layout description of an integrated circuit embodying the processing system; and an integrated circuit generation system configured to manufacture the processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

This Summary is provided merely to illustrate some of the concepts disclosed herein and possible implementations thereof. Not everything recited in the Summary section is necessarily intended to be limiting on the scope of the disclosure. Rather, the scope of the present disclosure is limited only by the claims.

6

BRIEF DESCRIPTION OF THE DRAWINGS

Examples will now be described in detail with reference to the accompanying drawings in which.

Figure 1:
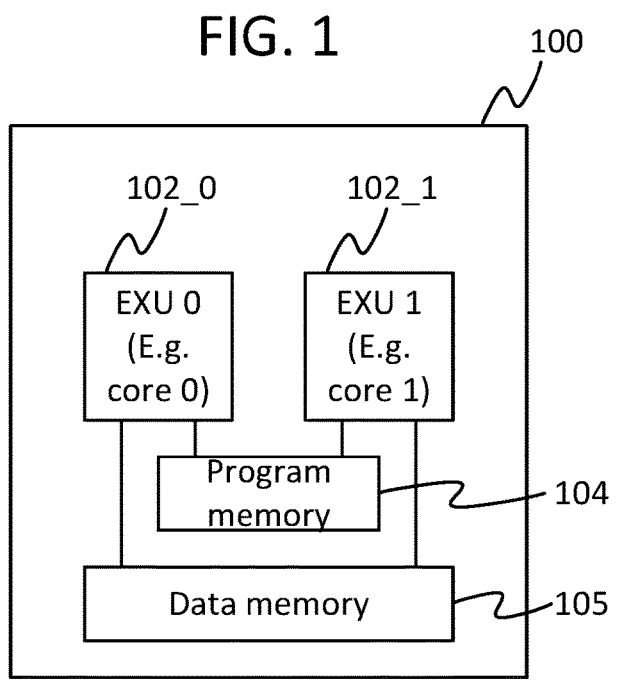
FIG. 1 is a schematic block diagram of a processing system comprising more than one execution unit.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Consider a chip with two (or more) identical CPUs, named CPU 0 and CPU 1, where it is desired to check that an output from running run on one of these CPUs does not contain hardware-derived faults. The current state of the art is to run the identical software on the two pieces of hardware at the same time and compare the outputs to check they are the same. This can contribute to achieving the ASIL-D safety standard, for example. However, a limitation of this process is it requires duplicating the hardware to achieve the desired result and not using the extra hardware for useful work.

According to the present disclosure, a new component, nominally referred to as a safety thread scheduler (STS), is provided in order to balance the need to run useful work and to check for a hardware fault within a defined time (which could be programmable). It's common for CPUs to have idle time. Therefore rather than scheduling the two identical threads on two identical pieces of hardware in parallel, one of the threads can be delayed until there is an available idle time to do the safety checking if the "safety thread scheduler" can guarantee that the checking can be done in an acceptable amount of time, which can be known from the performance of the first thread.

To facilitate this, the inputs and outputs from CPU 0's safety critical thread may be captured, e.g. in main or dedicated memory, such that the inputs can be replayed identically to CPU 1 and the outputs can be compared with the output of CPU 1. In some embodiments the inputs and/or outputs may be stored and compared in a compressed form. The inputs/outputs of CPU 0 and CPU 1 are unlikely to be changing frequently and therefore it should be possible to achieve a high compression of the inputs and outputs such they reduce their space in memory and reduce the area impact.

FIG. 1 shows more generally a schematic block diagram of a processing system 100 comprising multiple parallel, heterogeneous execution units. The processing system 100 comprises at least two parallel execution units 102_0, 102_1; and more generally may comprise any plural number K of parallel execution units 102_0 . . . 102_K-1 as shown later in FIG. 6. In embodiments each processing unit may comprise a respective pipeline. Preferably the execution units 102_0 . . . 102_K-1 are all architecturally identical to one another.

The processing system 100 further comprises a program memory 104 and a data memory 105 to which each of the execution units 102_0 . . . 102_K-1 is operatively coupled. The processing system 100 may all be integrated onto the same integrated circuit (IC), i.e. the same die (chip); or alternatively may be spread across more than one IC in the same IC package, or even different IC packages on the same board or different boards. The execution units 102_0 . . . 120_K-1 may be implemented on the same IC or different ICs, or some on the same IC and some on the different IC. Each of the program memory 104 and data memory 105 may be implemented in any one or more memory devices employing one or more storage media, e.g. an electronic medium such as RAM (static or dynamic), ROM, EEPROM, flash memory or a solid state drive; or a magnetic medium such as hard disk drive. The program memory 104 may be implemented on the same IC as one, more or all of the execution units 102_0 . . . 102_K-1, or externally, or a combination with some memory on the same IC and some external. Similarly the data memory 105 may be implemented on the same IC as one, more or all of the execution units 102_0 . . . 102_K-1, or externally, or a combination with some memory on the same IC and some external. The program memory 104 and data memory 105 may be implemented in different memory devices than one another, or may be implemented as different regions in the same memory device, or a combination of the same and different devices. Note also that either or both memories 104, 105 may include one or more layers of cache.

In one embodiment the different execution units 102_0 . . . 102_K-1 are different CPU cores of the same multi-core processor integrated into one IC package. The execution units 102_0 . . . 102_K-1 may be referred to as "cores" in the following for convenience, but it will be appreciated that this is not limiting and in the description of any embodiment any reference to a core could be replaced more generally with "execution unit". In embodiments the program memory 104 and data memory 105 may be implemented in local memory integrated into the same IC as the cores 102_0 . . . 102_K-1, but again this is not limiting. Also, note again that the illustration of separate program and data memories for schematic purposes does not necessarily imply these are implemented as distinct blocks: that is certainly one possibility, or alternatively they could just be different regions in the same physical block of memory (where each region could comprise a contiguous or non-contiguous set of addresses in address space).

In operation, each of the cores 102_0 . . . 102_K is arranged to execute a respective sequence of instructions fetched from the program memory 104. Each sequence is formed of one or more threads (each thread comprising a subsequence of instructions), such that each core 102_0 . . . 102_K-1 executes a respective series of threads. The cores (or more generally execution units) 102_0 . . . 102_K-1 are described as parallel to one another, in that each core 102_k is operable to execute its respective series of threads in parallel with each other of the cores 102_0 . . . 102_k-1, 102_k+1 . . . 102_K-1. That is, parallel means the series executed by each execution unit can be executed in parallel (at least partially overlapping in time) with the series executed by each other of the plurality of execution units.

In executing the instructions of each thread in its respective series of threads, each core 102_0 . . . 102_K-1 may load respective data from the data memory 105, operate on that data, and store data to the data memory 105. The loading and storing may be done by executing load and store instructions which reference source and destination addresses, respectively, for loading the data from and storing the data to in the data memory 105.

One or more of the cores 102_0 . . . 102_K-1, or a separate host or master CPU (not shown), or a combination, may run an operating system (OS). In a multi-core processor in general, the OS may be responsible for scheduling the threads to be run on the different cores 102_0 . . . 102_K-1 (i.e. selecting which thread is to be run on which core and when). Alternatively the scheduling could be done by dedicated scheduling hardware or a combination of the OS and dedicated scheduling hardware. In accordance with the disclosure herein, at least the scheduling of check threads— i.e. duplicate instances of critical threads—is implemented by dedicated hardware thread scheduler, as will be discussed in more detail shortly.

The processing system 100 runs one or more threads designated as critical, in amongst a plurality of non-critical threads which are any threads not designated as critical. In general the critical and non-critical threads could be run in any combination across any of the cores 102_0 . . . 102_K-1. Hence each core executes a respective series of threads that includes a plurality of non-critical threads, and the series executed by at least one of the cores includes at least one critical thread. In addition, the duplicate of each critical thread, i.e. its check thread, needs to be scheduled to be executed on a different core than the corresponding primary instance of the critical thread.

Figure 2:
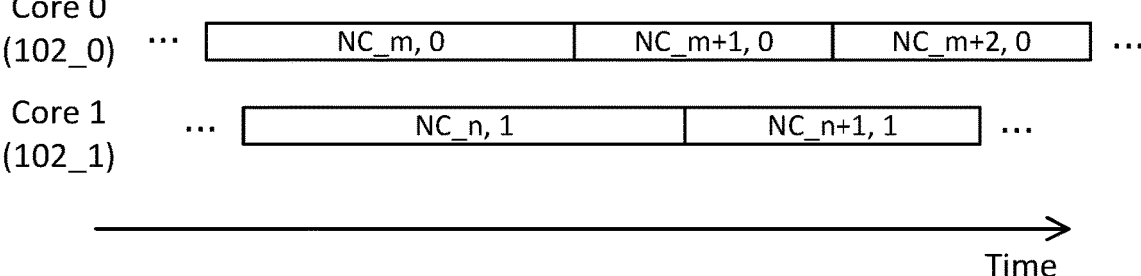
FIG. 2 is a timing diagram showing an example of scheduling of non-critical threads.

By way of example, FIG. 2 shows a scenario where each of two cores 102_0 and 102_1 executes a respective series of threads which, up to the point illustrated in FIG. 2, so far only includes non-critical (NC) threads. In the illustrated example, core 0 executes a series including non-critical threads NC_m,0; NC_m+1,0; and NC_m+1,0. Core 1 executes a series including non-critical threads NC_n,1; and NC_n+1,1. In each series the threads are scheduled back-to-back, i.e. avoiding idle time between non-critical threads on any of the cores 102_0, 102_1, so as to maximise the processing throughput of the system. I.e. in the series of core 0, then once NC_m,0 has finished executing, the next thread NC_m+1,0 starts executing as soon as possible afterwards, preferably in the next processing cycle or only a few cycles thereafter. Similarly in the series executed by core 1, then once NC_n,1 has finished executing, the next thread NC_n+ 1,1 begins as soon as possible thereafter, etc.

When executing non-critical threads this arrangement works well to avoid idle time between threads. However an issue arises when a critical thread needs to be scheduled for execution, which will require scheduling a duplicate instance of the critical thread on another core so that its output can be checked against the output of the primary instance of the critical thread. Conventionally in order to do this kind of check, the operating system on the processor has to schedule two thread instances of a given critical thread at exactly the same time (or in practice typically a small predetermined number of cycles offset from one another)— in so-called "lockstep".

However, to schedule two threads in lockstep requires two cores to be available at the same time (or approximately the same time). Assuming the processing system 100 is usually being kept busy, there is a low chance that two cores simply happen to become idle at the same time (i.e. the execution of different non-critical threads on different cores is unlikely to be aligned in time). Therefore to be able to schedule the critical thread and its duplicate instance (the check thread) in lockstep, this means the operating system or scheduling hardware has to deliberately hold one core in the idle state for a period after completing its most recent thread, while it waits for another core to finish its own current thread and also become idle. This will result in wasted time resource on the core that is held idle.

Figure 3:
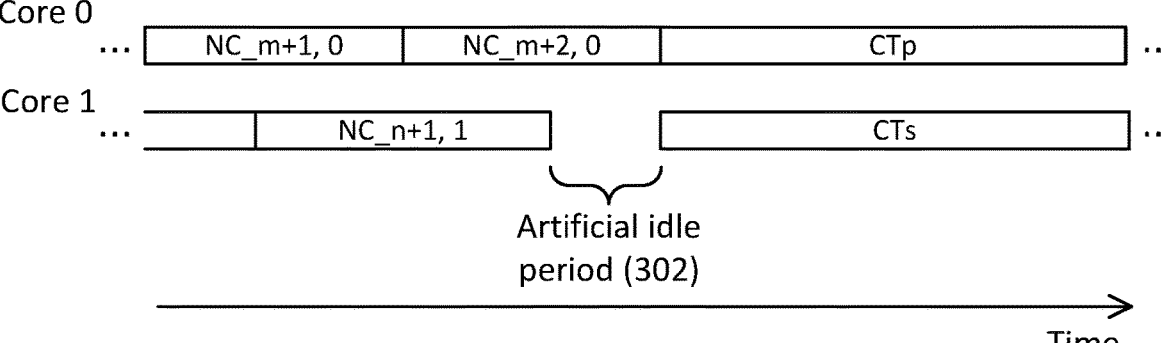
FIG. 3 is a timing diagram showing an example of a conventional method of scheduling non-critical and critical threads.

The issue is illustrated by way of example in FIG. 3. Say for example that a critical thread CTp is scheduled to be run on the first core, core 0 (102_0), following the non-critical thread NC_m+2,0. The instance of the critical thread CTp that is scheduled in its own right, e.g. by the OS, as part of the application program (as opposed to the duplicate instance which is scheduled just for checking purposes) may be referred to herein as the "primary instance" of the critical thread, or simply just "the critical thread". In addition, the OS or the scheduling hardware has to schedule a duplicate instance CTs of the critical thread to run on a different core than the primary instance CTp. The duplicate instance CTs may also be referred to herein as the "secondary instance" of the critical thread, or the "check thread". If there are only two cores as shown in FIG. 1 for example, then the secondary instance (check thread) CTs will have to be run on the second core, core 1 (102_1). The processing system 100 has plenty of work to do, and so would otherwise—if no safety check had to be done—be scheduling non-critical (NC) threads back-to-back as shown in FIG. 2. However, when a check thread is to be scheduled, which conventionally has to be executed in lockstep with the critical thread (i.e. primary instance), then the OS or scheduling hardware will have to ensure that both cores 102_0, 102_1 become idle at the same time. In the example shown, the end of the thread NC_m+ 2,0 scheduled on the first core 102_0 immediately preceding the critical thread CTp does not align in time with the end of any of the threads NC_n, 1; NC_n+1,1 . . . run on the second core 102_1 (i.e. the two cores don't simply happen to become idle at the same time, which could happen but is unlikely on any given occasion). Therefore instead, the OS or scheduling hardware will have to artificially hold the second core 102_0 in the idle state for a certain period 302 following the preceding thread NC_n+1,1 run on the second core 102_0, until the first core 102_0 also becomes idle following the completion of NC_m+2,0. The execution of the primary and secondary instances CTp, CTs of the critical thread in lockstep can then begin on the two cores 102_0, 102_1.

In other words, the OS or scheduling hardware has to deliberately keep one core idle for a period 302 while it waits for the other core to finish what it is doing so that the two cores can execute the two instances of the critical thread in lockstep.

Thus conventionally, executing critical threads incurs an additional, forced idle time 302 which introduces an undesirable latency into the processing by the second core 102_1, and thus reduces the processing throughput of the system 100. In other words it wastes the potential available processing resource of the second core. In a pipelined execution unit this could also be described as a "pipeline bubble". It would be desirable to be able to avoid or at least mitigate this issue.

One could instead interrupt one of the non-critical threads ( ) to run the check thread in its place. E.g. in the example of FIG. 3 the thread to interrupt could be a notional thread NC_n+2,1 on core 102_1, not shown in the example of FIG. 3 but being the thread that would follow NC_n+1, 1 and that would otherwise still be running when core 102_0 finishes running thread NC_m+2,0. However this would require saving the program state of the interrupted non-critical thread to memory, then re-loading the program state and resuming execution of the interrupted non-critical thread after the check thread had completed. This would incur an undesirable amount of additional software overhead.

If there are more than two cores 102_0 . . . 102_K−1 then the OS or scheduling hardware may select any of the plurality of other cores (other than that on which the primary instance CTp is run) to execute the check thread CTs—it doesn't necessarily have to select the second core 102_1. But assuming the cores are all currently busy then the OS or scheduling hardware will still have to intervene on one of them to run the check thread CTs and so the same issue will arise.

Figure 6:
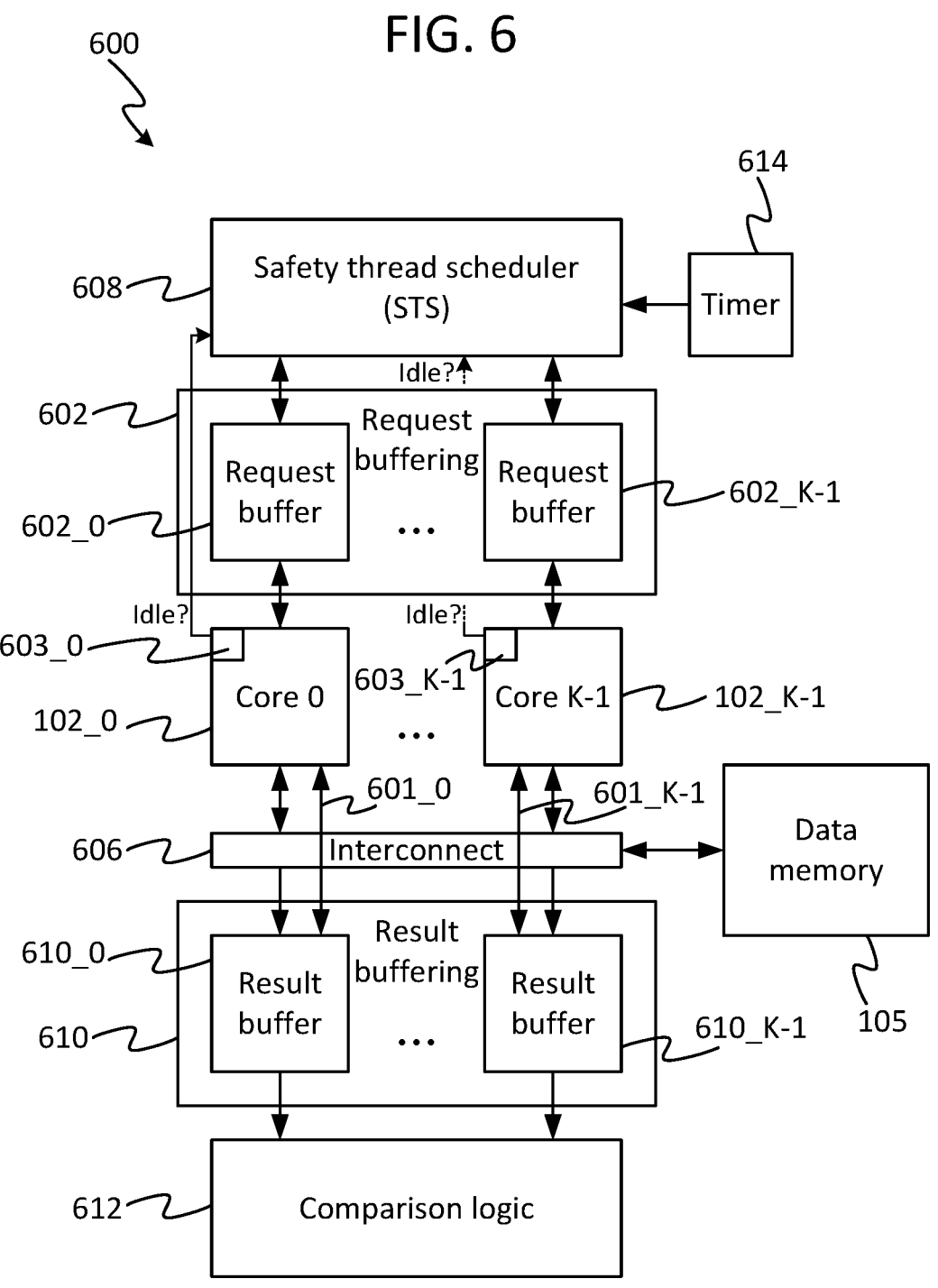
FIG. 6 is a schematic block diagram of a processing system in accordance with embodiments disclosed herein.

FIG. 6 shows an improved design for the processing system 100 which addresses the above-described issue in accordance with the present disclosure.

The disclosed processing system 100 comprises the plurality of cores 102_0 . . . 102_K−1 as described in relation to FIG. 1, as well as the data memory 105, and the program memory 104 (not shown in FIG. 6). The processing system 100 further comprises request buffering storage 602, safety thread scheduling circuitry 608, result buffering storage 610, and comparison circuitry 612.

Each of the cores 102_0 . . . 102_K−1 is operatively coupled to the data memory 105 and the result buffering storage 610, e.g. via a suitable interconnect 606 (such as a crossbar interconnect). Each of the cores 102_0 . . . 102_K−1 is also operatively coupled to the request buffering storage 602. The safety thread scheduling circuitry 608 is operatively coupled to the request buffering storage 602. The comparison circuitry 612 is operatively coupled to the result buffering storage 610.

The safety thread scheduling circuitry 608 is implemented in dedicated, fixed-function hardware. For brevity it may also be referred to herein as the safety thread scheduler (STS). The comparison circuitry 612 is also implemented in dedicated fixed-function hardware. It may also be referred to herein as the comparison logic. The request buffering storage 602 may be implemented in any form of temporary storage device or devices, such as a RAM or one or more hardware buffers. The request buffering storage 602 could be part of the general data memory 105 or a separate device, such as special purpose RAM, or a combination. In embodiments, the request buffering storage 602 may comprise a separate individual request buffer 602_0 . . . 602_K–1 for each of the cores 102_0 . . . 102_K–1 respectively. The result buffering storage 610 may also be implemented in any suitable form of memory device or devices, such RAM as or one or more hardware buffers. The result buffering storage 610 could be part of the general data memory 105 or a separate device, such as special purpose RAM, or a combination. It could be part of the same memory device as the request buffering storage 602 or separate, or a combination. In embodiments, the result buffering storage 610 may comprise a separate individual result buffer 610_0 . . . 610_K–1 for each core 102_0 . . . 102_K–1 respectively. In some such embodiments, the result buffer 610_0 . . . 610_K–1 for each core 102_0 . . . 102_K–1 comprises a respective memory access queue (MAQ) for the respective core.

In operation, the OS (or potentially some other scheduling software or component) may schedule non-critical threads and the critical threads (the primary instances) to be scheduled across the cores 102_0 . . . 102_K–1 in the normal manner. In embodiments very little modification to the OS software is required. In addition however, when scheduling a critical thread CTp, a request is written to the request buffering storage 602 to indicate that the thread is to be treated as critical. The request may be received from software executing on one of the plurality of cores 102_0 . . . 102_K–1, or from another execution unit (not shown) that is part of the processing system, e.g. a host or master CPU. In embodiments it is written by the OS, but it could potentially be by some other scheduling software or component. In embodiments the OS writes the request by calling a special function which may be named_Safe.

In embodiments, the request is written to the individual request buffer 602_k associated with the respective core 102_k on which the primary instance of the critical thread CTp is to be run. However the possibility of buffering requests for multiple critical threads across multiple cores in a common request buffer is also not excluded as an alternative implementation.

By whatever means it is written, the request in the request buffering storage 602 identifies the thread CTp that is to be treated as critical, e.g. by means of a thread ID and/or entry PC (program counter values). It may also include any other starting register values for the thread in question. Furthermore, the request also includes an indication of the duration of a safety time-window, which for brevity may also be referred to here just as the "safety window" (SW). The safety window is the maximum time by which the duplicate instance CTs (i.e. check thread) of the critical thread must start. It is defined as the maximum time by which the check thread CTs must start after the start of the primary instance CTp. This will be discussed in more detail shortly.

The safety thread scheduler (STS) 608 is arranged to read the request from the request buffering storage 602. In response, based on the information in the request, the STS 608 will schedule a corresponding check thread CPs (i.e. a secondary, duplicate instance of the critical thread CTp identified in the request). In other words the request informs the STS 608 to try to schedule a check thread from that point forward in time. It also informs the STS 608 of the core on which the thread was scheduled, so that the STS avoids scheduling the check thread on the same core. Based on this information, the safety thread scheduler 608 will schedule the check thread CTs to be executed on one of the cores 102_0 . . . 102_K–1, other than that on which the primary instance CTp has been scheduled to execute, e.g. by the OS (the STS 608 has hardware to track where the primary thread is scheduled, e.g. this information being filled in by the OS in STS registers). So if the core on which the primary instance CTp is scheduled is called the first core, e.g. 102_0, then the STS 608 schedules the corresponding check thread CTs to run on a second one of the cores, e.g. 102_1.

The processing system 100 also includes hardware 103_0 . . . 103_K–1 for each of one, some or all of the cores 102_0 . . . 102_K–1 respectively to indicate to the STS 608 when the respective core is idle. This could be described as an idle flag for each core, though this term is not intended to necessarily limit to a single bit nor any particular form of signal (though no more than a single bit is needed). In embodiments for example, the idle flag 103_0 . . . 103_K–1 for each core 102_0 . . . 102_K–1 could be implemented in memory mapped register or registers to which the STS 608 has access. An alternative would be to provide a dedicated signal line from each core 102_0 . . . 120_K–1 to the STS 608.

Based on the idle flag(s) 103_0 . . . 103_K–1, the safety thread scheduler (STS) 608 is configured to detect when at least one of the cores 102_0 . . . 102_K–1 is idle (i.e. monitor whether the core is idle). In embodiments the STS 608 is configured to detect when each of some or all of the cores 102_0 . . . 102_K–1 is idle (i.e. monitor whether each individual core is idle).

The processing system 100 also comprises a timer 614 operatively coupled to the STS 608. The timer 614 may be a dedicated hardware timer for scheduling check threads CTs, or a general purpose hardware timer shared with other functions, or a dedicated or general purpose software timer run on one or more of the cores 102_0 . . . 102_K–1 or a separate master or host CPU, or a combination. By whatever means implemented, the timer 614 enables the STS 608 to determine a present time and thus compare the present time to the time of expiry of the specified safety window SW. Any scheduling described herein relative to the safety window will be understood as being performed by reference to the timer 614 and for brevity this will not be repeated each time the safety window is mentioned.

Based on the information from the flag(s) 103_0 . . . 103_K–1 and the timer 614, then the STS can determine whether any of the cores 102_0 . . . 102_K–1 is idle by the expiry of the safety window. If not, the STS 608 will interrupt one of the non-critical threads executing on a non-idle one of the cores and schedule the check thread CTs to execute on that core in place of the interrupted thread.

The safety window SW runs from the start of the (primary instance of the) critical thread CTp. So the STS 608 determines whether a second one of the cores 102_0 . . . 102_K–1 has become available (as idle) to begin executing the corresponding check thread CTs within the safety window as running from the start of the execution of the primary instance of the critical thread CTp on the first core. As mentioned above, the safety window is defined as the maximum time by which the check thread CTs must start after the start of the primary instance. Actually what matters is that the duplicate instance completes no later than by the end of a period having the same length as the safety window and starting from the completion of the primary instance, as in practice there will be a time by which, according to the requirements of the safety critical application in question, the results of the check thread CTs must become available in order to perform the check against the results of the primary instance CTp. But since the STS 608 needs to know the latest time by which to start the check thread CTs, it works in terms of start times on the assumption that the execution of threads is deterministic so the total time taken to execute each thread is fixed. The value (i.e. duration) of the safety window may depend on the application or the particular thread in question. The selected duration is programmable by means for the request written to the request buffering storage 602 for each critical thread on a thread-by-thread basis.

If a core 102_k becomes available (i.e. idle) before the expiry of the safety window SW, then in principle, depending on implementation, the STS 608 may schedule the check thread CTs to begin on that core any time between becoming idle and the expiry of the respective safety window.

Preferably however, the STS 608 may be configured so as, if one of the cores 102_0 . . . 102_K–1 is detected to be idle upon the reading of the request from the request buffering storage 602, to thereupon select an idle one of the cores to begin executing the check thread. Alternatively it is not excluded that the execution unit could wait even though there is currently a non-idle execution unit available at the time of reading the request from the request buffering storage, e.g. to keep it free for some other upcoming purpose if that is known, or to avoid unnecessarily delaying other threads in the expectation (or hope) that it will still be possible to execute the check thread on a core with no other work to do before the safety window ends.

If no core 102_0 . . . 102_K–1 is immediately available upon reading the request, the STS 608 will wait until one becomes idle. If one does become idle before the end of the safety window, then the check thread may be scheduled to run on that core any time between becoming idle and the expiry of the safety window. Preferably it begins the check thread straight away as soon as a suitable core becomes available, but again it is not excluded that it could wait until closer to the expiry of the safety window.

If no execution unit does become idle before the end of the safety window, then the safety thread scheduler will interrupt one of them if possible.

Most preferably the STS 608 is configured so as: i) if one of the cores 102_0 . . . 102_K–1 is detected to be idle upon the reading of the request from the request buffering storage 602, to thereupon select an idle one of the cores to begin the execution of the check thread; but ii) if none of the cores 102_0 . . . 102_K–1 is detected to be idle upon the reading of the request, to wait and detect whether one of the cores becomes newly idle before the expiry of the safety window and if so thereupon select the newly idle core to begin the execution of the check thread; but only if iii) none of the cores 102_0 . . . 102_K–1 becomes idle by the expiry of the safety window, to interrupt one of the non-critical threads executing on a non-idle one of the cores and select the non-idle core to begin executing the check thread in place of the interrupted non-idle thread.

In other words, the STS 608 tries to pick an idle core where available but otherwise can interrupt a non-critical thread. If no idle core is currently available for the duplicate instance of the critical thread, then the STS will wait until one becomes available, except that if no idle cores become available before the end of the safety window the STS will interrupt another non-critical thread.

Figure 4:
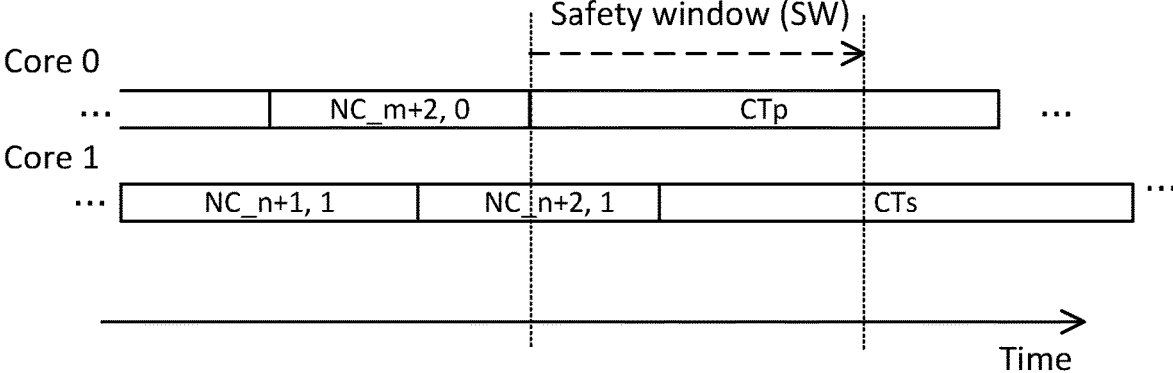
FIG. 4 is a timing diagram showing an example of a method of scheduling non-critical and critical threads in accordance with embodiments disclosed herein.

An effect of the described system is illustrated by way of example in FIG. 4 (c.f. the situation in the convention al case of FIG. 3). As the STS 608 can delay the scheduling of the duplicate instance (i.e. check thread) CTs and take advantage of when the STS sees an opportunity to schedule the check thread, this advantageously hides idle time.

The program state of any interrupted thread is saved to memory (e.g. SRAM) so it can be resumed again later. The interrupted non-critical thread can be resumed on the same, second core (e.g. 102_1) as that on which the check thread CTs was run, once the check thread has finished. Or it could resume on another of the cores 102_0 . . . 102_K–1 if and when another becomes available.

The result buffering storage 610 is arranged to receive and buffer either or both of: at least one first result, being a result of the execution of the (primary instance of the) critical thread CTp on the first core (e.g. 102_0); and at least one second result, being a result of the execution of the corresponding check thread CTs on the second core (e.g. 102_1). In embodiments the result of only one of the two threads, e.g. the primary thread, need to be buffered in the result buffering storage 610; and the comparison logic 612 will compared the buffered results of one thread (e.g. primary thread CTp) with the incoming results of the other thread (e.g. secondary, check thread CTs) received via the interconnect 606. Alternatively in other implementations, it is not excluded that the results of both threads could be buffered and compared from the result buffer 610.

The results of the two thread instances CTp, CTs may be their respective memory accesses, i.e. reads and/or writes to memory addressed locations in the data memory 105, or a signature based thereon. This may mean the results comprise the addresses, or the payload data that is loaded/stored, or both. Preferably at least the addresses of both loads and stores are captured. Alternatively or additionally the results may comprise one or more other pieces of information, such as the operand data that was operated upon or that resulted from the operations performed by the threads CTp, CTs; or an architectural state such as one or more register values resulting from the execution of the threads. The results are automatically written out to the result buffering storage 610. In embodiments the result(s) of each thread instance CTp, CTs to be buffered is/are written to the respective one of the individual result buffer 610_0 . . . 610_K–1, e.g. memory access queue (MAQ), associated with the respective core on which the thread instance was executed. In embodiments a direct connection 601_k may be provided from each core 102_k to its respective result buffering storage 610_k, to allow it to buffer its results directly rather than going via the interconnect 606.

Note: in embodiments, the check thread CTs is not actually accessing memory itself, only the primary thread CTp is, and then the check thread's core gets the data from the memory access queue (a FIFO). To elaborate, say the primary and check thread access memory location 0x5: the actual access to 0x5 is done by the primary core (say CPU 0) and the result is loaded into the memory queue (as expected). The check thread (say on CPU 1) simply reuses the data in the memory queue instead of re-accessing memory location 0x5 again. This is further aided by embodiments in which the check thread is scheduled at least a few cycles later than the primary thread.

In one implementation the OS needs to call another function called the _Unsafe function to tell the STS 608 to stop recording results to the result buffering storage 610 (e.g. memory access queue). In such embodiments the STS 608 needs to be told by the OS when the primary instance of the critical thread CTp completes, because the STS itself doesn't have the concept of a thread, it just keeps duplicating the sequence of instructions from the primary instance until told to stop. Alternatively however it is not excluded that in other implementations the STS 608 may be set up to automatically detect when the primary instance completes and in response automatically stop recording the results.

By whatever means the results are collected, the comparison logic 612 is arranged to compare the first and second results based on the result buffering storage 610, and to raise an error signal if the first and second results do not match according to said comparison. In embodiments, only the result(s) of one of the primary and secondary threads (e.g. the primary thread CTp) is/are buffered in the result buffering storage 610 (e.g. in the respective result buffering storage 610_k, such as the MAQ, associated with the core 102_k running that thread). The comparison logic 612 then compares the buffered results of that thread with incoming results of the other of the two threads (e.g. the secondary thread CTs), which may be received by the comparison logic 612 via the interconnect 606 from the core 102 running that other thread. For instance, in embodiments it is only necessary to buffer the primary thread CTp, and the check thread CTs is checked as-and-when the transactions are generated in real time (or close to real time). However in an alternative implementation, it is not excluded that the results of both the primary and secondary (e.g. check) thread could be buffered, and the comparison logic 612 compares the buffered results of both threads from the result buffering storage 610.

Either way, the comparison is done in hardware by the comparison logic 612. If there is a mismatch, an error signal is raised. Depending on implementation the error signal could be a signal to software (e.g. the OS or an application), or a hardware error handler (not shown), or both. In embodiments the error signal may comprise an exception raised to an exception handler (not shown), e.g. an interrupt controller, for the system 100 to react accordingly. The exception handler could be implemented in hardware or in software (e.g. as part of the OS), or a combination.

For example, the processing system 100 (e.g. via the exception handler) may be configured so as in response to the error signal (e.g. exception) to perform any of the following. It may output a warning through a user interface to which the processing system 100 is connected. Alternatively or additionally, the processing system 100 may disable one or both of the cores 102_0, 102_1 on which the primary and secondary instances CTp, CTs of the critical thread were executed, but continue executing threads on at least one remaining of the cores. Alternatively it may halt execution across the whole processing system 100 (i.e. across all cores 102_0 . . . 102_K–1). Another possibility is that the system 100 schedules the critical thread CTp and check thread CTs to be executed again at least one more time, either on the same or different ones of the cores, and repeat the comparison each time. Then if the error signal is still obtained, this may be indicative of a hardware fault, so the system may take action such as to output the warning, or disable one or more of the cores or the whole system. But if the error signal is no longer encountered after the one or more repetition, this may indicate that the error was due to a random bit flip (e.g. due to cosmic radiation) so the system may continue normal execution once a successful repetition of the critical thread has been achieved.

In some embodiments the system 100 could run the critical thread CTp and check thread CTs on different combinations of cores in order to try to track down which core is faulty. If just running a pair of threads on the same pair of cores then it is not possible to say whether it was the first or second core, or even both, that experienced the fault. However, if the system runs CTp and CTs on a first and second core 102_0, 102_1 respectively and gets an error, then tries again by running CTp on the first core but CTs on a third core 102_2 for example, and the error is not encountered, then this may indicate that it was the second core 102_1 that experienced the fault. Similarly if the system tries again by running CTs on the same second core but CTp on a new, third core, and does not get an error, then this indicates that the fault was on the first core. If the conclusion is to discover a faulty core (possibly after further trials to rule out random bit flips), then the faulty core could be switched off. The retrying could be done automatically by the STS 608, or in alternative implementations it may be done explicitly by the OS or other software, or a combination of the STS and OS/software.

What is done in response to the error signal may depend on the implementation and/or the particular situation.

In embodiments, the STS 608 may be configured to raise a panic condition in the eventuality that no core becomes idle for executing the check thread by the expiry of the safety window SW, and no core is running a non-critical thread that can be interrupted. In other words, a panic condition is raised if all the cores are busy executing non-interruptible threads such as critical threads or check threads whose safety window has already expired. The panic condition is another type of error signal, and could also be called the panic signal. What is done in response to a panic condition could be the same or different than if an error signal is raised. E.g. the system 100 could output a warning via the user interface, or halt execution on one or more cores or the whole system, or run an emergency exception handling routine.

As a further alternative or additional feature, in embodiments the request buffering storage 602 can hold multiple requests for different critical threads, and the STS 608 may service the requests in order of priority, where priority is determined according to how imminent the expiry of the respective safety window is. This will reduce the chance that no available core can be found to service a given check thread by the end of its respective safety window (and so reduce the chance that a panic condition will be raised).

With regard to capturing the results, in embodiments all outputs in terms of memory accesses performed by each of the primary and secondary instances of the critical thread are captured in the result buffering storage 610. Alternatively however, the results may be stored in a condensed or alternative form to reduce on storage requirements for the result buffering storage 610. This may comprise for example storing the results in a compressed form, and/or storing an architectural register state of the core in question (e.g. program counter and/or other one or more register values) instead of the full memory accesses. An example of compression would be a hash of the memory accesses. The results of the two thread instances CTp, CTs run on the two cores 120_0, 102_1 may then also be compared in their condensed (e.g. compressed) form, rather than needing to decompress or expand them. For instance in one implementation, the results could be stored and compared in the form of an architectural state, e.g. PC & register values, plus a hash of memory accesses.

As mentioned earlier, in embodiments both the inputs and outputs from the core (e.g. core 0) on which safety critical thread CTp is run may be captured, e.g. in main or dedicated memory, such that the inputs can be replayed identically to core 1 and the outputs can be compared with the output of core 1. The inputs/outputs of core 0 and core 1 are unlikely to be changing frequently and therefore it should be possible to achieve a high compression of the inputs and outputs such they reduce their space in memory and reduce the area impact. In embodiments some or all of the outputs may be stored in the result buffering storage 610 in compressed form. Regarding the possible compression of the inputs, in embodiments certain inputs may be compressed, and certain other inputs may not be. For example: interrupt signalling may not need to be compressed. However, read data coming in to the primary core from memory (this is also an input) may be compressed before storing it in the memory access queue.

A core such as a CPU typically has many outputs, and to capture these over many cycles might require a significant amount of memory utilization depending on the application and compression that can be achieved. Therefore, by capturing the architectural register state upon completion of a thread or some other checkpoint, the amount of memory required by this system could be significantly reduced.

If using the architectural state, rather than the outputs of the core to perform the checking. This opens many options in terms of the PPA (power, performance, area trade-off) of core 1. For example, the micro-architecture and technology node of core 1 could be selected to minimize the power and area impact of the fault detection.

Figure 5:
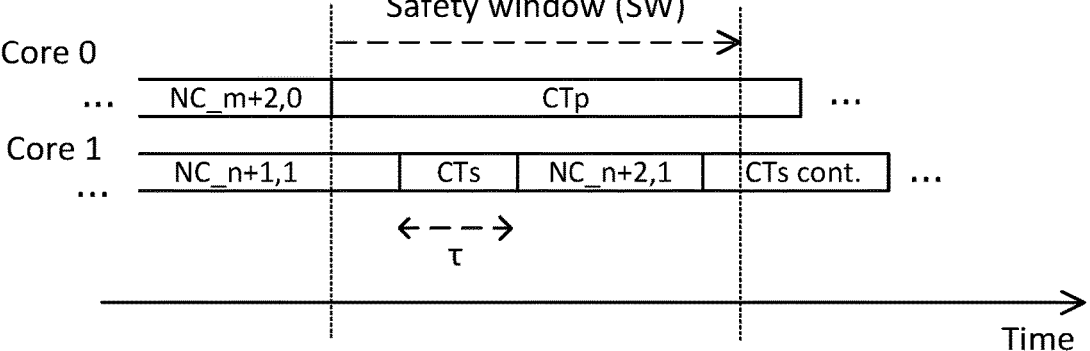
FIG. 5 is a timing diagram showing an example of another method of scheduling non-critical and critical threads in accordance with embodiments disclosed herein.

FIG. 5 illustrates, by way of example, another optional additional concept that may be used in conjunction with the basic concept described in relation to FIGS. 4 and 6, either in addition to or independently of any of the further optional features discussed subsequently (e.g. options for responding to the error signal, the possibility of raising a panic signal, the prioritization of servicing requests, and the different options for the form in which results are stored and compared). The additional concept here is as follows. If a check thread CTs is scheduled to begin executing before the expiry of its respective safety window SW—either because an idle core happened to be available already for executing the check thread straight away upon starting execution of the corresponding primary instance CTp, or because a core became available later but still earlier than the expiry of the safety window—then the check thread may be described as "eager" or as being executed "eagerly". According to embodiments disclosed herein, the safety thread scheduler (STS) 608 may allow additional flexibility for scheduling further threads surrounding the execution of an eager check thread.

FIG. 5 shows one example of this. Here, the STS 608 will allow the OS to interrupt a check thread CTs to run one or more further critical or non-critical threads (in this example NC_n+2,1) as long the interruption occurs before the end of the safety window SW, and as long as the check thread resumes again before the end of the safety window. Or in fact, the time limit for resuming execution of the check thread CTs could be extended beyond the safety window SW by the amount of time τ that the secondary instance of the critical thread spent executing before it was interrupted. I.e. the time limit for resuming is SW+τ (or in principle any time between SW and SW+τ). However for simplicity of implementation, the time limit for resuming the check thread CTs may simply be taken as the expiry of the original safety window SW.

The OS may interrupt a check thread CTs because the OS is not aware of a check thread being scheduled. In embodiments the OS is only aware of primary threads. This assumption simplifies the OS design and allows existing OSes to be ported to this system without much modification. In such embodiments the STS 608 has the role, implemented in hardware, of both interrupting existing check threads CTs and non-critical threads NC. However, the STS cannot interrupt a primary thread CTp. In preferred implementation, as much of the functionality is placed into hardware, instead of OS or other software. Note that it is up to the OS to interrupt a primary thread if that is desired.

As an alternative or additional degree of flexibility, an eager check thread CTs running on one core, say a 102_1, may be interrupted to run one or more further critical or non-critical threads on that core in its place; and the interrupted check thread may be migrated to be run on a third core, e.g. 102_2. The third core 102_2 may be one that is idle, or one running another non-critical thread which can be interrupted to run the migrated check thread. In embodiments the STS 608 may be configured to perform the migration automatically if the OS interrupts the check thread by scheduling a further thread on the same core 102_1. Alternatively the migration could be performed by the OS.

A reason to interrupt an eager check thread to run another thread, rather than just running the further thread on another core, is to provide flexibility to the OS. As mentioned above, in embodiments the OS is not aware of check threads, and might actually require resources on which a check thread is running at that moment. Further, this gives more flexibility to move the check thread around. The migration is possible because an interface is provided on the core which allows the STS to capture all of the CPU state. This is how the STS can capture CPU state. Another interface allows the CPU state to be overridden. These special interfaces on the CPU is what allows the auto switch to occur.

In embodiments, the rules for eager and non-eager check threads may be summarized as follows.

A check thread CTs can be eagerly scheduled before its schedule timer expires. When done so, the part of the safety thread scheduled 608_k becomes eager.

Eager threads can be interrupted by non-critical/primary/non-eager check threads.

Non eager check threads are check threads scheduled after the schedule timer expires.

A check thread may execute partly in eager mode and partly in non-eager mode. There may be a gap between both modes. There may be gaps within eager mode.

The eager mode can be moved across CPU cores 102_0 . . . 102_K–1. If CPU 0 is executing a check thread eagerly and the OS takes it out of idle, the STS automatically moves the thread to another idle CPU (or) waits for an idle CPU to be found (or) waits for timer expiry.

An idle CPU becomes a target for eager execution.

A non eager check thread cannot be interrupted.

Note: while the concept of eager execution, and the ability to interrupt an eager thread, has been described above in conjunction with the idea of delaying the initial scheduling of the check thread, this is not limiting. Irrespective of whether execution of the check thread was delayed awaiting an idle execution unit, or whether it began executing in lockstep with its respective critical thread (perhaps even in a system where the availability of two idle execution units is artificially created as in FIG. 2 or where the check thread begins by interrupting another thread), then the idea of interrupting an eagerly executed check thread can nonetheless still be applied in order to create more opportunities for scheduling after the initial scheduling of the check thread.

Figure 7:
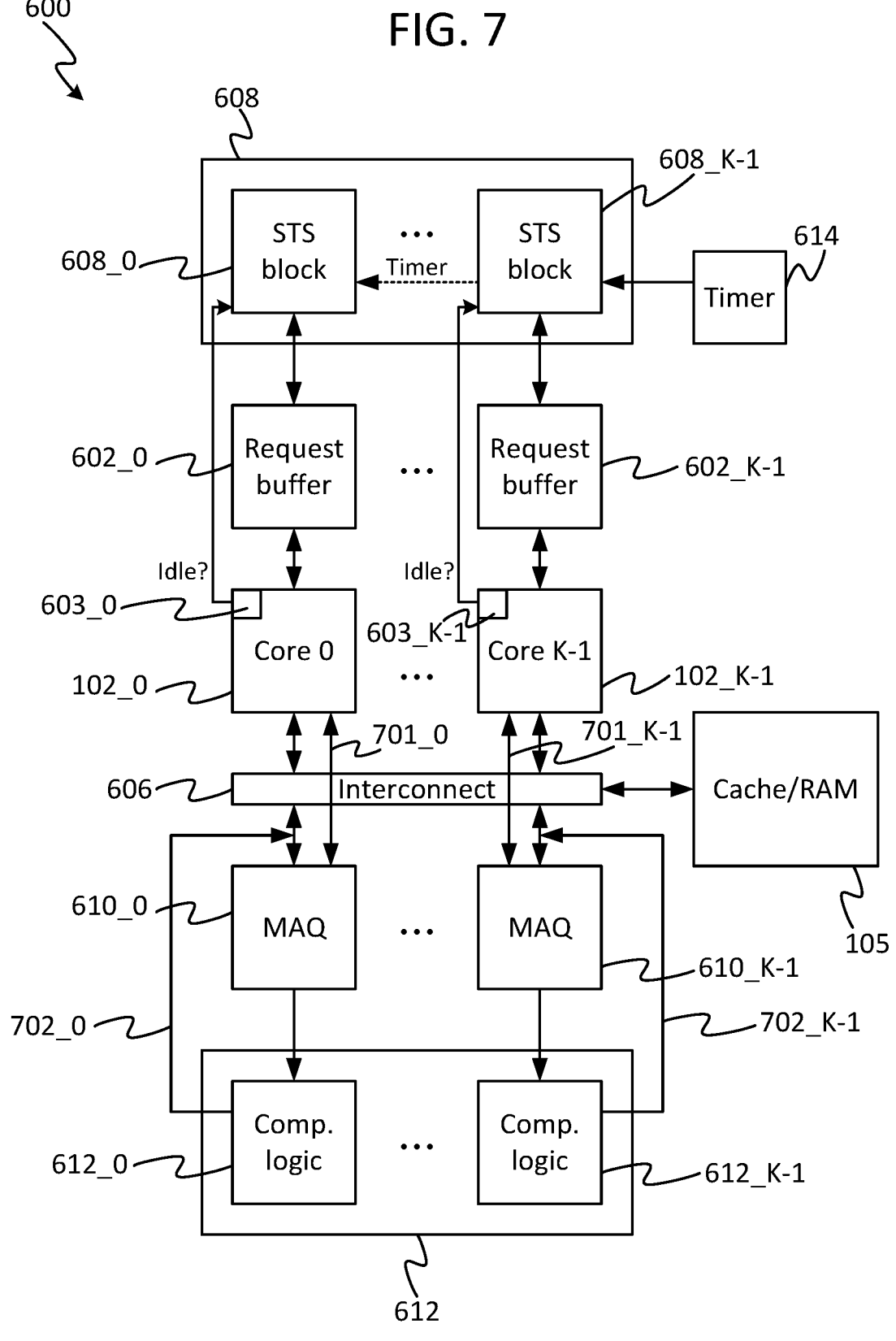
FIG. 7 is another schematic block diagram of a processing system in accordance with embodiments disclosed herein.

FIG. 7 shows a particular example implementation of the processing system of FIG. 6. Here The STS 608 comprises an individual respective STS block 601_0 . . . 608_K–1 for each core 102_0 . . . 102_K–1, and the comparison logic 612 comprises an individual respective comparison block 612_0 . . . 612_1 associated with each core 102_0 . . . 102_K–1. The result buffers 610_0 . . . 610_K–1 comprises the memory access queues (MAQs) associated with each respective core. The data memory 105 may comprise RAM and optionally an associated cache. The line 702_$k$ shown going from each comparison logic block 612_$k$, to the connection between its respective core 102_$k$ and the interconnect 606, represents a bus interface. As in the case of FIG. 6, there is also provided a direct connection 601_$k$ between each core 102_$k$ and its respective result buffering storage (e.g. MAQ) 610_$k$, rather than needing to communicate via the interconnect 606. A core 102_$k$ running the primary thread CTp buffers its own respective results via a direct connection 601_$k$ with its own result buffering storage 610_$k$, and then the comparison logic 612_$k$ associated with the core running the primary thread compares the results of the primary thread with the results from the secondary/check thread CTs received via the interconnect 606 (which are not necessarily buffered).

Figure 11:
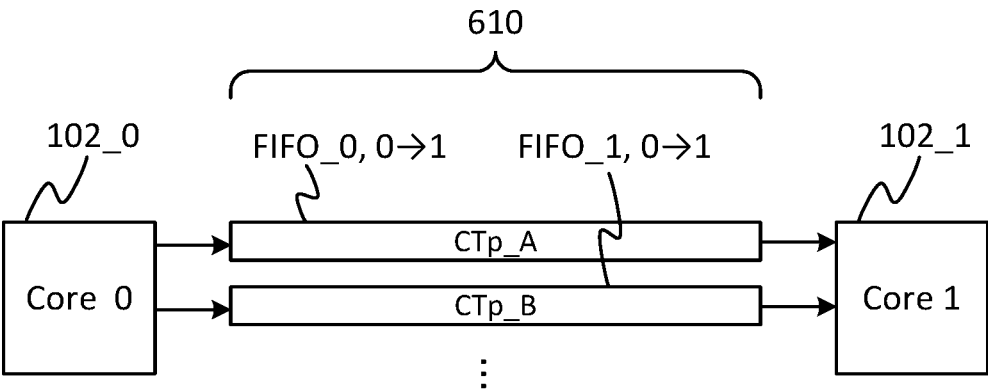
FIG. 11 is a schematic block diagram of an example of an alternative arrangement of memory access queues in accordance with particular embodiments disclosed herein.

FIG. 11 shows a further optional extension to the disclosed ideas, which may be used in conjunction with or independently of any of the other optional features disclosed herein.

Figure 10:
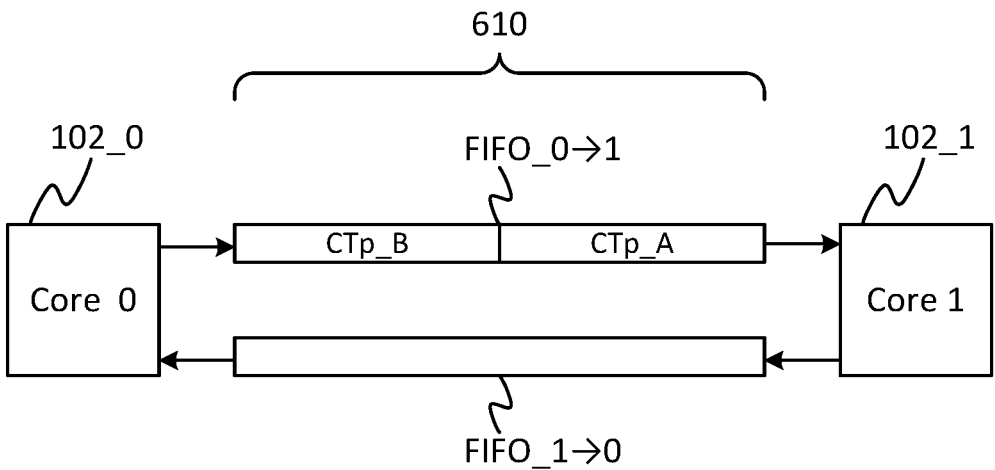
FIG. 10 is a schematic block diagram of an example arrangement of memory access queues.

FIG. 10 shows a simpler implementation by way of contrast. In the arrangement of FIG. 10, the result buffing storage 610 comprises a memory access queue in the form of a first-in, first-out (FIFO) buffer FIFO_0→1 from one core 102_0 to another 102_1, and similarly in the other direction FIFO_1←0. These are an implementation of the MAQs 610_0 . . . 610_$K$−1 in FIG. 6. FIFO_0→1 buffers the results from core 0 (102_0) to the comparison logic 612_1 of core 1 (102_1), and vice versa in the opposite direction should that be required. Say that core 0 executes a first critical thread CTp_A and then a second, subsequent critical thread CTp_B; and that corresponding first and second check threads CTs_A and CTs_B are to be run on core 1. In the illustrated arrangement of FIG. 10, with only a single queue in a given direction, this means the results of CTp_B will be buffered behind the results of CTp_B in the queue, and hence the comparison logic block 612_1 won't be able to perform the comparison of the results of the check thread CTs_B with the results of CTp_B before the comparison of the results of CTs_A with those of CTp_A. Hence The second check thread CTs_B can't be scheduled before the first CTs_A. However the second check thread CTs_B could have a much shorter respective safety window, so it may be desirable to be able to prioritise the running of CTs_B and the checking of CTs_1 vs CTp_1 over the running of CTs_A and the checking of the results of CTs_0 vs CTp_0.

FIG. 11 shows an alternative implementation that will allow this. Here, the memory access queue in a given direction between at least one pair of cores, e.g. from core 0 to core 1 in the illustrated example, comprises at least two parallel FIFOs: FIFO_0,0→1; and FIFO_1,0→1. This way the results from CTp_B can be buffered in parallel with the results from CTp_A, and hence it is possible for run and check CTs_B before CTs_B. In other words the check thread CTs_B corresponding to the later critical thread CTp_B can "overtake" the check thread CTs_A corresponding to the earlier critical thread CTp_A, if its safety window is shorter (i.e. if checking CTp_B is a more urgent priority than checking CTp_A even though CTp_A started earlier). The idea of the parallel queues may be replicated in both directions and across all pairs of cores, but for brevity of illustration only one direction between one pair is shown in FIG. 11.

Figure 8:
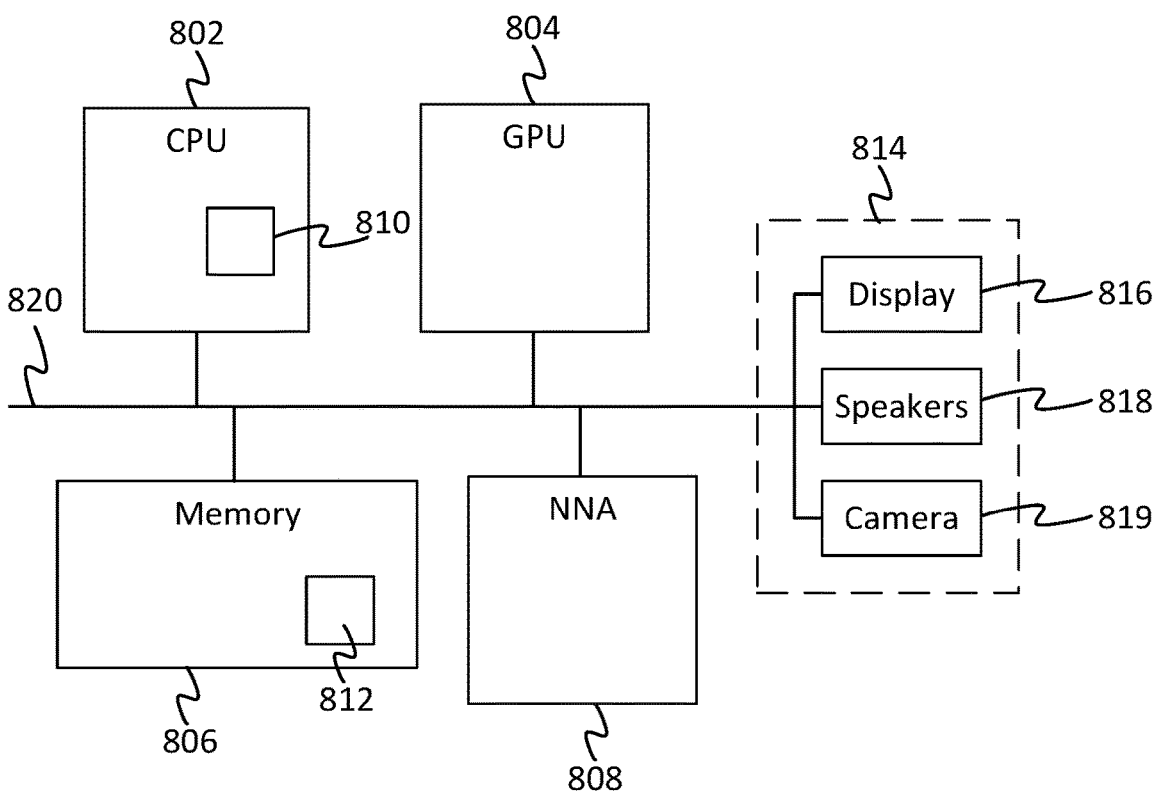
FIG. 8 is a schematic block diagram of a computer system in which a graphics processing system is implemented.

FIG. 8 shows a computer system in which the graphics processing systems described herein may be implemented. The computer system comprises a CPU 802, and a memory 806, and may also comprise a GPU 804, neural network accelerator (NNA) 808 and/or other devices 814, such as a display 816, speakers 818 and a camera 819. A processing block 810 (corresponding to processing block 600 in FIG. 6 or 7) is implemented on the CPU 802. In other examples, one or more of the depicted components may be omitted from the system, and/or the processing block 810 may be implemented on the GPU 804 or NNA 808. The components of the computer system can communicate with each other via a communications bus 820. A store 812 is implemented as part of the memory 806. The memory 806 or store 812 in FIG. 8 may represent one or more memory devices employing one or more memory media, e.g. an electronic medium such as ROM, EEPROM, flash memory, RAM or a solid state drive, or a magnetic medium such as a hard disk drive. Some or all of the program memory 104 from which the program threads are retrieved may be implemented in the store 812, or in an internal memory of the processing block 810, or a combination. Similarly the data memory 105 may be implemented in the store 812, or in an internal memory of the processing block 810, or a combination. The request buffering storage 602 and result buffering storage 610 are preferably implemented in internal memory of the processing block 810, such as a local RAM or dedicated memory, but could in principle instead be implemented in the store 812, or a combination.

The processing system of FIGS. 1 and 6-8 are shown as comprising a number of functional blocks. This is schematic only and is not intended to define a strict division between different logic elements of such entities. Each functional block may be provided in any suitable manner. It is to be understood that intermediate values described herein as being formed by a processing system need not be physically generated by the processing system at any point and may merely represent logical values which conveniently describe the processing performed by the processing system between its input and output.

The processing systems described herein may be embodied in hardware on an integrated circuit. The processing systems described herein may be configured to perform any of the methods described herein. Generally, any of the functions, methods, techniques or components described above can be implemented in software, firmware, hardware (e.g., fixed logic circuitry), or any combination thereof, unless stated otherwise. In general the terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a processing system configured to perform any of the methods described herein, or to manufacture a processing system comprising any apparatus described herein. An integrated circuit definition dataset may be, for example, an integrated circuit description.

Therefore, there may be provided a method of manufacturing, at an integrated circuit manufacturing system, a processing system as described herein. Furthermore, there may be provided an integrated circuit definition dataset that, when processed in an integrated circuit manufacturing system, causes the method of manufacturing a processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processing system will now be described with respect to FIG. 9.

Figure 9:
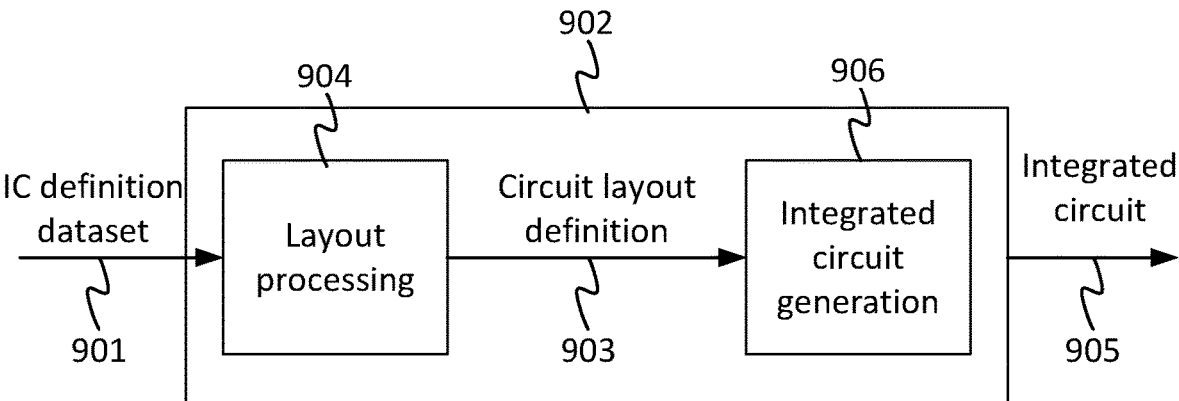
FIG. 9 is a schematic block diagram of an integrated circuit manufacturing system for generating an integrated circuit embodying a graphics processing system.

FIG. 9 shows an example of an integrated circuit (IC) manufacturing system 902 which is configured to manufacture a processing system as described in any of the examples herein. In particular, the IC manufacturing system 902 comprises a layout processing system 904 and an integrated circuit generation system 906. The IC manufacturing system 902 is configured to receive an IC definition dataset (e.g. defining a processing system as described in any of the examples herein), process the IC definition dataset, and generate an IC according to the IC definition dataset (e.g. which embodies a processing system as described in any of the examples herein). The processing of the IC definition dataset configures the IC manufacturing system 902 to manufacture an integrated circuit embodying a processing system as described in any of the examples herein.

The layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 1006. A circuit layout definition may be, for example, a circuit layout description.

The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

According to one aspect disclosed herein, there is provided a processing system comprising: a plurality of parallel execution units each operable to execute a respective series of threads, wherein at least some of the threads executed by at least some of the execution units are non-critical threads not being designated as critical; request buffering storage operable to receive a request indicating that one of the threads in the respective series executed by a first one of the execution units is designated as a critical thread; safety thread scheduling circuitry arranged to read the request from the request buffering storage, and in response to schedule a check thread, being a duplicate of the critical thread, to be executed on a second one of the plurality of execution units other than the first execution unit; result buffering storage arranged to buffer one of: a first result being a result of the execution of the critical thread on the first execution unit, and a second result being a result of the execution of the check thread on the second execution unit; and comparison circuitry arranged to compare said one of the first and second results from the result buffering storage with the other of the first and second results, and to raise error signal if the first and second results do not match according to said comparison; wherein the request includes an indication of a safety time-window; and wherein the safety thread scheduling circuitry is configured to detect when at least one of the execution units is idle, and if none of the execution units is detected to be idle by the expiry of the safety time-window, to interrupt one of the non-critical threads executing on a non-idle one of the execution units and select the non-idle execution unit as the second execution unit to execute the check thread in place of the interrupted thread.

In embodiments, the safety thread scheduling circuitry may be configured so as: if one of the execution units is detected to be idle upon the reading of the request from the request buffer storage to thereupon select an idle one of the execution units as the second execution unit to begin the execution of the check thread; but if none of the execution units is detected to be idle upon the reading of the request, to wait and detect whether one becomes newly idle before the expiry of the safety time-window if so and thereupon select the newly idle execution unit as the second execution unit to begin the execution of the check thread; but if none becomes idle by the expiry of the safety time-window, to perform said interruption of one of the non-critical threads executing on a non-idle one of the execution units and select the non-idle execution unit as the second execution unit to begin the execution of the check thread in place of the interrupted non-idle thread.

In embodiments, the safety thread scheduling circuitry may be configured so as: if one of the execution units is detected to be idle upon the reading of the request from the request buffer storage to thereupon select an idle one of the execution units as the second execution unit to begin the execution of the check thread; but if none of the execution units is detected to be idle upon the reading of the request, to wait and detect whether one becomes newly idle before the expiry of the safety time-window if so and thereupon select the newly idle execution unit as the second execution unit to begin the execution of the check thread; but if none becomes idle by the expiry of the safety time-window, to perform said interruption of one of the non-critical threads executing on a non-idle one of the execution units and select the non-idle execution unit as the second execution unit to begin the execution of the check thread in place of the interrupted non-idle thread.

In embodiments, the safety thread scheduling circuitry may be configured so as to allow the check thread to be interrupted if executed eagerly, being executed eagerly if the execution of the check thread begins being executed before the expiry of the safety time-window; the interruption of the check thread comprising scheduling one or more further critical or non-critical threads to be executed on the second execution unit in place of the check thread.

In embodiments, the safety thread scheduling circuitry may be configured so as, if the one or more further threads have not completed by expiry of a re-scheduling time limit, to interrupt one of the one or more further threads by resuming the execution of the check thread on the second execution, but otherwise to resume execution of the check thread following the completion of the one or more further threads; the re-scheduling time limit being either: a) the expiry of safety time-window, b) the expiry of the safety time-window plus any time already spent executing the check thread, or c) a time in between a) and b).

In embodiments, the safety thread scheduling circuitry may be configured so as, when the eagerly executed check thread is interrupted by the further thread, to migrate the eagerly executed check thread to another of the execution units other than the first and second execution units.

In embodiments, the safety thread scheduling circuitry may be configured to raise a panic condition if none of the execution units becomes idle nor is found to be executing a non-critical thread before the expiry of the safety time-window.

In embodiments, the first result may comprise an indication of memory accesses performed by the critical thread and the second result comprises an indication of memory accesses performed by the check thread.

In embodiments, the first and second results may be output and compared in compressed form.

In embodiments, the processing system may be configured so as in response to the error signal to: A) output a warning through a user interface, or B) disable the first and/or second execution units but continue executing threads on at least one remaining of the execution units, or C) halt execution across the whole processing system, or D) execute the critical thread and check thread again at least once on the same or different ones of the execution units and repeat the comparison each time, then perform one of A)-C) if the repeated comparison still raises the error signal.

In embodiments, the request buffering storage may be operable to buffer multiple requests, each indicating that a respective one of the threads executed on a respective first one of the execution units is to be classed as a critical thread, wherein each request includes an indication of a respective safety time-window; wherein the thread scheduling circuitry is configured to schedule a respective check thread to be executed on a respective second one of the execution units other than the respective first execution unit, the respective check thread being a duplicate of the respective critical thread; the result buffering storage is arranged to buffer at least a respective first result of each respective critical thread, or a respective second result of each respective check thread; the comparison circuitry is configured to compare each second result with the respective first result and raise an error signal if the respective second result doesn't match the respective first result; and the safety thread scheduling circuitry is configured to schedule the check threads in order of priority wherein the priority is determined according to how close the respective safety time-window is to expiry.

In embodiments, the result buffering storage may comprise a respective memory access queue for each of the plurality of execution units, and each memory access queue comprises multiple FIFOs for buffering the results of different threads executed on the same execution unit.

According to another aspect disclosed herein, there may be provided a method comprising: scheduling a respective series of threads to execute on a plurality of parallel execution units, wherein at least some of the threads executed by at least some of the execution units are non-critical threads not being designated as critical; receiving a request indicating that one of the threads in the respective series executed by a first one of the execution units is designated as a critical thread; scheduling a check thread in response to the request, the check thread being a duplicate of the critical thread, to be executed on a second one of the plurality of execution units other than the first execution unit; buffering one of: a first result being a result of the execution of the critical thread on the first execution unit, and a second result being a result of the execution of the check thread on the second execution unit; comparing a first result with a second result, the first result being a result of the execution of the critical thread on the first execution unit, and the second result being a result of the execution of the check thread on the second execution unit; and detecting whether the first and second results match according to said comparison; wherein the request includes an indication of a safety time-window; and wherein the method further comprises detecting when at least one of the execution units is idle, and upon none of the execution units being detected to be idle by the expiry of the safety time-window, interrupting one of the non-critical threads executing on a non-idle one of the execution units and select the non-idle execution unit as the second execution unit to execute the check thread in place of the interrupted thread.

According to another aspect disclosed herein, there is provided a safety thread scheduler configured to schedule a check thread for a critical thread being run on one of a plurality of execution units, the check thread being a duplicate of the critical thread; the safety thread scheduler being configured to schedule the check thread to begin being run on a second one of the plurality of execution units before the end of a safety time-window for scheduling the check thread; and the safety thread scheduler being further configured to allow the check thread, when the check thread is running on the second one of the plurality of execution units, to be interrupted by a further thread and to re-schedule the check thread to be resumed by expiry of a re-scheduling time limit.

In embodiments, the safety thread scheduler may be configured to perform the re-scheduling of the check thread by interrupting another thread, other than the critical thread, running on one of the execution units other than the first execution unit, thereby resuming execution of the check thread on the execution unit upon which the other thread was running.

In embodiments, the safety thread scheduler may be operable such that the interrupted other thread is the further thread on the second execution unit, such that the check thread resumes on the second execution unit.

In embodiment, the safety thread scheduler may be operable such that the interrupted other thread is a thread, other than the critical thread and the further thread, running on a third one of the execution units other than the first and second execution units, such that the check thread is migrated to the third execution unit.

In embodiments the re-scheduling time limit may be either: a) the expiry of a safety time-window of a predetermined length running from a point at which the execution of the critical thread begins, or b) the expiry of the safety time-window plus any time already spent executing the check thread, or c) a time in between a) and b).

In embodiments, the safety thread scheduler may be operable to initially schedule the check thread to begin executing, before the interruption by the further thread, any time between the point at which the execution of the critical thread begins and the expiry of the safety time-window.

In embodiments, the safety thread scheduler may be configured to perform the initial scheduling of the check thread by: i) if at least one of the execution units is detected to be idle by the point at which the execution of the critical thread begins, to select an idle one of the execution units as the second execution unit to begin the execution of the check thread; but ii) if none of the execution units is detected to be idle by the point at which the execution of the critical thread begins, to wait and detect whether one becomes newly idle before the expiry of the safety time-window if so and thereupon select the newly idle execution unit as the second execution unit to begin the execution of the check thread; but iii) if none of the execution units becomes idle by the expiry of the safety time-window, to interrupt a non-critical thread executing on a non-idle one of the execution units and select the non-idle execution unit as the second execution unit to begin the execution of the check thread.

In embodiments, the safety thread scheduler may be configured to raise a panic condition if none of the execution units becomes idle nor is found to be executing a non-critical thread before the expiry of the safety time-window.

In embodiments, the safety thread scheduler may be configured to perform the re-scheduling of the check thread by migrating the check thread to a third of said execution units other than the first and second execution units, resuming execution of the check thread on the third execution unit.

In embodiments the further thread may be a thread other than a check thread.

In embodiments the further thread may be a critical thread. Alternatively the further thread may be a non-critical thread.

In embodiments there may be provided a processing system comprising the execution units and the safety thread scheduler.

The processing system may further comprise comparison circuitry configured to compare a first result with a second result, the first result being a result of the execution of the critical thread on the first execution unit, and the second result being a result of the execution of the check thread on the second execution unit; wherein the comparison circuitry is configured to raise error signal if the first and second results do not match according to said comparison.

In embodiments the first result may comprise an indication of memory accesses performed by the critical thread and the second result may comprise an indication of memory accesses performed by the check thread.

In embodiments the first and second results may be output and compared in compressed form.

In embodiments the processing system may be configured so as in response to the error signal to: A) output a warning through a user interface, or B) disable the first and/or second execution units but continue executing threads on at least one remaining of the execution units, or C) halt execution across the whole processing system, or D) execute the critical thread and check thread again at least once on the same or different ones of the execution units and repeat the comparison each time, then perform one of A)-C) if the repeated comparison still raises the error signal.

According to another aspect disclosed herein, there is may be provided method comprising: scheduling a check thread for a critical thread being run on one of a plurality of execution units, the check thread being a duplicate of the critical thread, wherein the scheduling of the check thread comprises scheduling the check thread to begin being run on a second one of the plurality of execution units before the end of a safety time-window for scheduling the check thread; and when the check thread is running on the second one of the plurality of execution units, interrupting the check thread by a further thread and re-scheduling the check thread to be resumed by expiry of a re-scheduling time limit.

According to further aspects disclosed herein, there may be provided a corresponding method of operating the processing system, and a corresponding computer program configured to operate the processing system. According to yet further aspects there may be provided a corresponding method of manufacturing the processing system, a corresponding manufacturing facility arranged to manufacture the processing system, and a corresponding circuit design data set embodied on computer-readable storage.

For instance according to one aspect there may be provided a non-transitory computer readable storage medium having stored thereon a computer readable description of the processing system of any embodiment herein which, when processed in an integrated circuit manufacturing system, causes the integrated circuit manufacturing system to: process, using a layout processing system, the computer readable description of the processing system so as to generate a circuit layout description of an integrated circuit embodying said processing system; and manufacture, using an integrated circuit generation system, the processing system according to the circuit layout description.

According to another aspect, there may be provided an integrated circuit manufacturing system comprising: a non-transitory computer readable storage medium having stored thereon a computer readable description of the processing system of any embodiment disclosed herein; a layout processing system configured to process the computer readable description so as to generate a circuit layout description of an integrated circuit embodying said processing system; and an integrated circuit generation system configured to manufacture the processing system according to the circuit layout description.

According to another aspect there may be provided a method of manufacturing, using an integrated circuit manufacturing system, a processing system of any embodiment disclosed herein, the method comprising: processing, using a layout processing system, a computer readable description of said circuit so as to generate a circuit layout description of an integrated circuit embodying the processing system; and manufacturing, using an integrated circuit generation system, the processing system according to the circuit layout description.

According to another aspect there may be provided a layout processing system configured to determine positional information for logical components of a circuit derived from the integrated circuit description so as to generate a circuit layout description of an integrated circuit embodying the processing system of any embodiment disclosed herein.

Other variants, implementations and/or applications of the disclosed techniques may become apparent to a person skilled in the art once given the disclosure herein. The scope of the present disclosure is not limited by the above-described embodiments but only by the claims.

What is claimed is:

1. A safety thread scheduling circuit configured to schedule a check thread for a critical thread being run on one of a plurality of execution units, the check thread being a duplicate of the critical thread;

the safety thread scheduling circuit being configured to schedule the check thread to begin being run on a second one of the plurality of execution units before the end of a safety time-window for scheduling the check thread; and the safety thread scheduling circuit being further configured to allow the check thread, when the check thread is running on the second one of the plurality of execution units, to be interrupted by a further thread and to re-schedule the check thread to be resumed by expiry of a re-scheduling time limit;

wherein the safety thread scheduling circuit is operable to perform the re-scheduling of the check thread by interrupting another thread, other than the critical thread, running on one of the execution units other than the first execution unit, thereby resuming execution of the check thread on the execution unit upon which the other thread was running.

2. The safety thread scheduling circuit of claim 1, wherein the safety thread scheduling circuit is operable such that the interrupted other thread is the further thread on the second execution unit, such that the check thread resumes on the second execution unit.

3. The safety thread scheduling circuit of claim 1, wherein the safety thread scheduling circuit is operable such that the interrupted other thread is a thread, other than the critical thread and the further thread, running on a third one of the execution units other than the first and second execution units, such that the check thread is migrated to the third execution unit.

4. The safety thread scheduling circuit of claim 1, wherein the re-scheduling time limit is either:

a) the expiry of a safety time-window of a predetermined length running from a point at which the execution of the critical thread begins, or b) the expiry of the safety time-window plus any time already spent executing the check thread, or c) a time in between a) and b).

5. The safety thread scheduling circuit of claim 4, operable to initially schedule the check thread to begin executing, before the interruption by the further thread, any time between the point at which the execution of the critical thread begins and the expiry of the safety time-window.

6. The safety thread scheduling circuit of claim 5, configured to perform the initial scheduling of the check thread by:

i) if at least one of the execution units is detected to be idle by the point at which the execution of the critical thread begins, to select an idle one of the execution units as the second execution unit to begin the execution of the check thread; but ii) if none of the execution units is detected to be idle by the point at which the execution of the critical thread begins, to wait and detect whether one becomes newly idle before the expiry of the safety time-window if so and thereupon select the newly idle execution unit as the second execution unit to begin the execution of the check thread; but iii) if none of the execution units becomes idle by the expiry of the safety time-window, to interrupt a non-critical thread executing on a non-idle one of the execution units and select the non-idle execution unit as the second execution unit to begin the execution of the check thread.

7. The safety thread scheduling circuit of claim 6, configured to raise a panic condition if none of the execution units becomes idle nor is found to be executing a non-critical thread before the expiry of the safety time-window.

8. The safety thread scheduling circuit of claim 1, configured to perform the re-scheduling of the check thread by migrating the check thread to a third of said execution units other than the first and second execution units, resuming execution of the check thread on the third execution unit.

9. The safety thread scheduling circuit of claim 1, wherein the further thread is a thread other than a check thread.

10. The safety thread scheduling circuit of claim 1, wherein the further thread is a critical thread.

11. The safety thread scheduling circuit of claim 1, wherein the further thread is a non-critical thread.

12. A processing system comprising the execution units and the safety thread scheduling circuit as set forth in claim 1.

13. The processing system of claim 12, further comprising comparison circuitry configured to compare a first result with a second result, the first result being a result of the execution of the critical thread on the first execution unit, and the second result being a result of the execution of the check thread on the second execution unit;

wherein the comparison circuitry is configured to raise error signal if the first and second results do not match according to said comparison.

14. The processing system of claim 13, wherein the first result comprises an indication of memory accesses performed by the critical thread and the second result comprises an indication of memory accesses performed by the check thread.

15. The processing system of claim 13, wherein the first and second results are output and compared in compressed form.

16. A method of manufacturing, using an integrated circuit manufacturing system, a safety thread scheduling circuit as set forth in claim 1, comprising inputting an integrated circuit dataset definition of said safety thread scheduler into an integrated circuit manufacturing system, so as to configure said integrated circuit manufacturing system to manufacture said safety thread scheduling circuit.

17. An integrated circuit manufacturing system configured to manufacture a safety thread scheduling circuit as set forth in claim 1.

18. A non-transitory computer readable storage medium having stored thereon a computer readable integrated circuit dataset description that, when processed in an integrated circuit manufacturing system, causes the integrated circuit manufacturing system to manufacture an integrated circuit embodying a processor comprising safety thread scheduling circuitry configured to schedule a check thread for a critical thread being run on one of a plurality of execution units, the check thread being a duplicate of the critical thread;

the safety thread scheduling circuitry being configured to schedule the check thread to begin being run on a second one of the plurality of execution units before the end of a safety time-window for scheduling the check thread; and the safety thread scheduling circuitry being further configured to allow the check thread, when the check thread is running on the second one of the plurality of execution units, to be interrupted by a further thread and to re-schedule the check thread to be resumed by expiry of a re-scheduling time limit;

wherein the safety thread scheduling circuit is operable to perform the re-scheduling of the check thread by interrupting another thread, other than the critical thread, running on one of the execution units other than the first execution unit, thereby resuming execution of the check thread on the execution unit upon which the other thread was running.

19. A method comprising:

scheduling a check thread for a critical thread being run on one of a plurality of execution units, the check thread being a duplicate of the critical thread, wherein the scheduling of the check thread comprises scheduling the check thread to begin being run on a second one of the plurality of execution units before the end of a safety time-window for scheduling the check thread; and when the check thread is running on the second one of the plurality of execution units, interrupting the check thread by a further thread and re-scheduling the check thread to be resumed by expiry of a re-scheduling time limit;

wherein the re-scheduling of the check thread comprises interrupting another thread, other than the critical thread, running on one of the execution units other than the first execution unit, thereby resuming execution of the check thread on the execution unit upon which the other thread was running.

\* \* \* \* \*